(12) United States Patent
Hovey

(10) Patent No.: X5867
(45) Date of Patent: Mar. 10, 1830

(54) PLANE IRONS

(76) Inventor: William Hovey

William Hovey, of Boston, Mss:
Letters Patent

The schedule referred to in these Letters Patent & making part of the same, containing a description in the words of the said William Hovey himself, of his improvement in the mode of making <u>bench plane irons</u> –

---

To all persons to whom these presents shall come: William Hovey of Boston, in the County of Suffolk, & Commonwealth of Massachusetts, Gentleman, sends greeting – Be it known that I the said William Hovey, have invented a new & useful improvement in the mode of making or manufacturing <u>bench plane irons</u>, & that the following is a full & exact description of the construction & operation of the said improvement, or process, as invented by me – In forming or producing the moulds for my plane irons, up to the point where my improvement commences, I take the following meth. od, I weld the steel on to large bars of iron & roll them into plates the steel being applied to the whole length of the plate – I then cut the plate crosswise, into pieces of suitable width for plane irons; – Those I consider moulds for plane irons, I next apply my improvement, which consists of the following process or method, & produces the following effect viz: The above mentioned moulds being prepared with a proper proportion of iron & steel, & of a suitable width for plane irons, & then apply these moulds to a rolling mill, having one or more eccentric rolls expressly fitted for the purpose – By the operation of this mill, I roll the mould to a proper length & thickness & produce the desired taper to the iron, from the thick end to the thin or upper end. In this manner I produce an uniform. ity in the shape or taper of plane irons, which renders their form more perfect than can be done by the common process of hammering. The manner of producing the eccentric rolls, is unimportant to my improvement, provided they are sufficiently eccentric in their surface, to produce the desired taper to the plane irons, when applied to said rolls, at a proper point to receive them in order to produce the above described effect – The rolling being completed the irons are finished in the usual way - As the before mentioned moulds may be produced by various & differ-
-ent processes. I consider my improvement in the method of manufacturing
plane irons to consist in the application of moulds, composed of iron & steel
of suitable size & proportion, to eccentric rolls, to produce the desired taper
to such irons - In Testimony that the above & foregoing is a true spe-
-cification of my said improvement, as herein before described, I have here-
unto set my hand & seal this eighteenth day of February in the year of
our Lord, one thousand eight hundred & thirty.

~ Witnesses
Simon S. Greene
Thomas A. Dexter

~ William Hovey

Exd.
W.G.

646